United States Patent [19]

Millsap

[11] Patent Number: 5,680,100
[45] Date of Patent: Oct. 21, 1997

[54] U-TURN SIGNAL

[76] Inventor: Thad Millsap, 6189 Cedarbrook Dr., W., Pinellas Park, Fla. 34664

[21] Appl. No.: 689,674

[22] Filed: Jul. 30, 1996

[51] Int. Cl.$^6$ .................................................. B60Q 1/22
[52] U.S. Cl. ........................................ 340/463; 340/475
[58] Field of Search ................................ 340/463, 464, 340/465, 468, 475, 479

[56] References Cited

U.S. PATENT DOCUMENTS

| | | | |
|---|---|---|---|
| 3,233,218 | 2/1966 | Borden | 340/475 |
| 3,454,941 | 7/1969 | Voorman, Jr. | 340/463 |
| 4,387,361 | 6/1983 | Reed | 340/475 |
| 4,868,541 | 9/1989 | Sullivan et al. | 340/464 |
| 4,994,786 | 2/1991 | Schaffer | 340/463 |
| 5,003,289 | 3/1991 | Roman | 340/475 |
| 5,086,289 | 2/1992 | Sullivan et al. | 340/475 |
| 5,281,950 | 1/1994 | Le | 340/475 |

*Primary Examiner*—Jeffery Hofsass
*Assistant Examiner*—Anh La
*Attorney, Agent, or Firm*—Patent & Trademark Services; Joseph H. McGlynn; Thomas Zack

[57] ABSTRACT

A U-turn visual indicator for use on a motor vehicle. The U-turn indicator may be mounted on the rear bank on signaling lights or the front signaling light bank, or both. A protective plastic lens with a bent arrow U-turn icon is placed over a light bulb whose operation is similar to that used in current vehicle turn signal lights. The flashing light from the indicator is independently controlled from within the vehicle by a switch located either on the dashboard or its steering column. Bimetallic contacts may be used to produce the flashing light emitted by the U-turn indicator.

6 Claims, 2 Drawing Sheets

U-TURN SIGNAL

BACKGROUND OF THE INVENTION

Modern automobiles have signal lights to alert motorists that the driver is intending to make a turn or is applying the brakes. However, when a driver wishes to make a U-turn he or she must either turn on the left hand flashing signal light or provide no signal to an on-coming motorist. This lack of a proper signaling device when a U-turn is intended presents a confusing and dangerous situation. The present invention seeks to overcome this confusion by providing for a dashboard mounted control which can independently actuate a flashing light mounted on the vehicle's front and rear which will alert both on-coming and following drivers to the operator's intention to make a U-turn.

DESCRIPTION OF THE PRIOR ART

Many of the prior art signaling devices are capable of intending that a vehicle operator is intending to make a U-turn. For example, in U.S. Pat. No. 4,387,361 to Reed, a hood mounted U-turn signal moves from a stored position to an extended position. In U.S. Pat. No. 5,003,289 to Roman, a U-turn arrow light is mounted in the rear window of a vehicle. Further, in U.S. Pat. No. 5,086,289 to Sullivan et al. a U-turn signal device mounted to the turn signal stalk is disclosed. And in the Le patent (U.S. Pat. No. 5,281,950) a U-turn signal with a timer to reset the device is described. The present invention, as set forth in this specification, differs from the known prior art by providing for a dashboard mounted control which can independently operate one or more flashing lights to indicate a U-turn is intended.

SUMMARY OF THE INVENTION

This invention relates to a U-turn indicator for a motor vehicle. The indicator with its lens and U-turn icon can be mounted in the rear or front, or both, banks of lights found in most vehicles. Its control switch is mounted either on the vehicle's dashboard or steering column to independently control the flashing of the U-turn indicator. A conventional flashing direction indicator and circuit which utilizes bimetallic strips whose electrical contacts make and break the circuit can be used to power and control the U-turn indicator's action.

It is the primary object of the present invention to provide for an improved U-turn signaling system for a vehicle.

Another object is to provide for such a system wherein the indicating lights flash and are controlled from the vehicle's dashboard or steering column.

These and other objects and advantages of the present invention will become apparent to readers from a consideration of the ensuing description and the accompanying drawings.

DESCRIPTION OF THE PREFERRED EMBODIMENT

Figure 1:
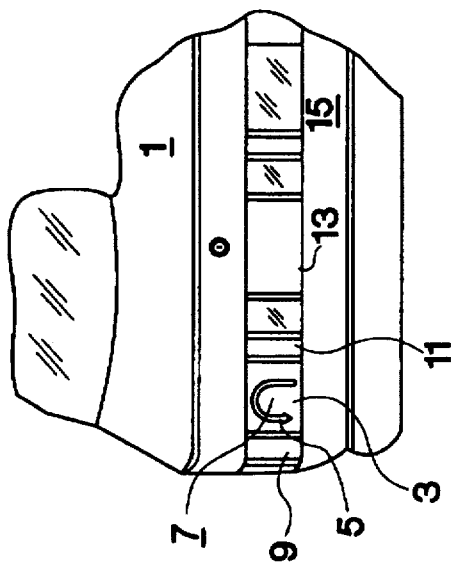
FIG. 1 is a perspective view of a vehicle mounted U-turn indicator in accordance with the invention's preferred embodiment.

FIG. 1 is a perspective view of a vehicle 1 mounted U-turn visual indicator 3 in accordance with the invention's preferred embodiment. The indicator has a bent arrow icon 5 which is etched or otherwise impressed into its plastic cover lens 7, located in this depiction, at the rear driver's side light bank. Also, forming part of this particular light bank are the conventional flashing turn signal light/lens 9, the brake light 11 and the white back-up light 13. It should be clear that the order of these four lights can vary and that the U-turn visual indicator light/lens can appear in the vehicle's front light bank neither alone or in combination with the rear light bank.

In most situations the U-turn light/lens 9 will be positioned on the vehicle's driver's side, or left side when seated in the operator's seat, above the rear or front bumpers 15. Conceivably it could be located elsewhere as long as it clearly visually alerts other motorists of the driver's intention to make a U-turn.

Figure 2:
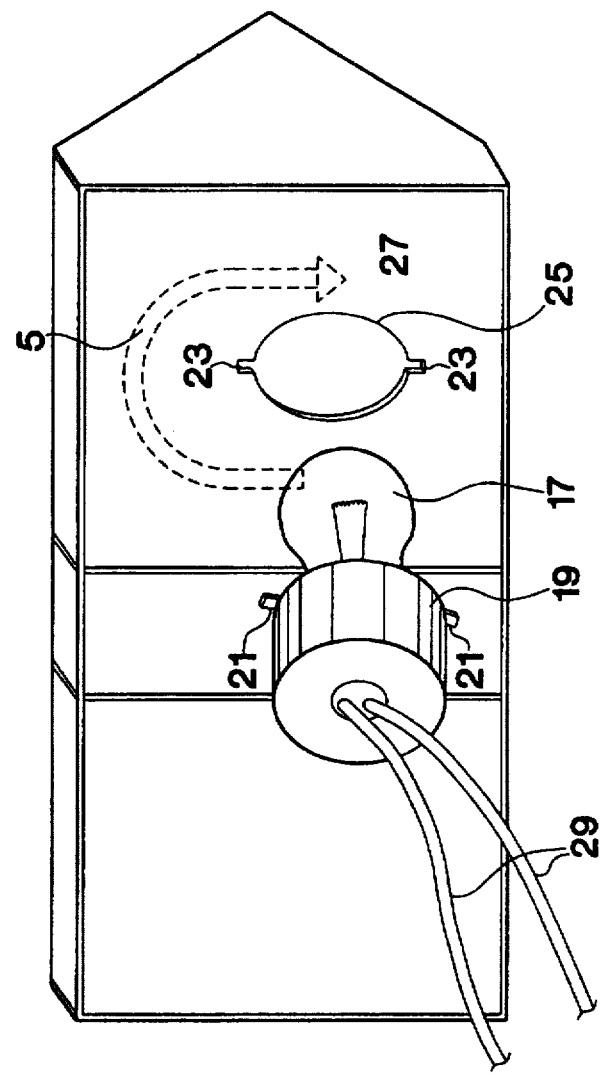
FIG. 2 is a rear perspective view of a light bulb being inserted behind the U-turn indicator of FIG. 1.

FIG. 2 is a rear perspective view of a light bulb 17 being inserted behind the U-turn indicator lens 7 of FIG. 1. Thus, this figure appears as if one where in the vehicle's trunk looking towards its rear. The conventional light bulb 17 is mounted by a screw type of attachment at its base into the lamp socket holder 19 which has two external protruding oppositely projecting arms 21. These arms fit through two complementary hole extensions 23 in the lamp assembly mounting hole 25. After being inserted therein the holder 19 is twisted to lock the holder and its light bulb in the rear mounting lamp base plate 27. Extending from holder 19 and two electrically conducting wires 29 which form part of the electric circuit schematically shown in FIG. 3.

Figure 3:
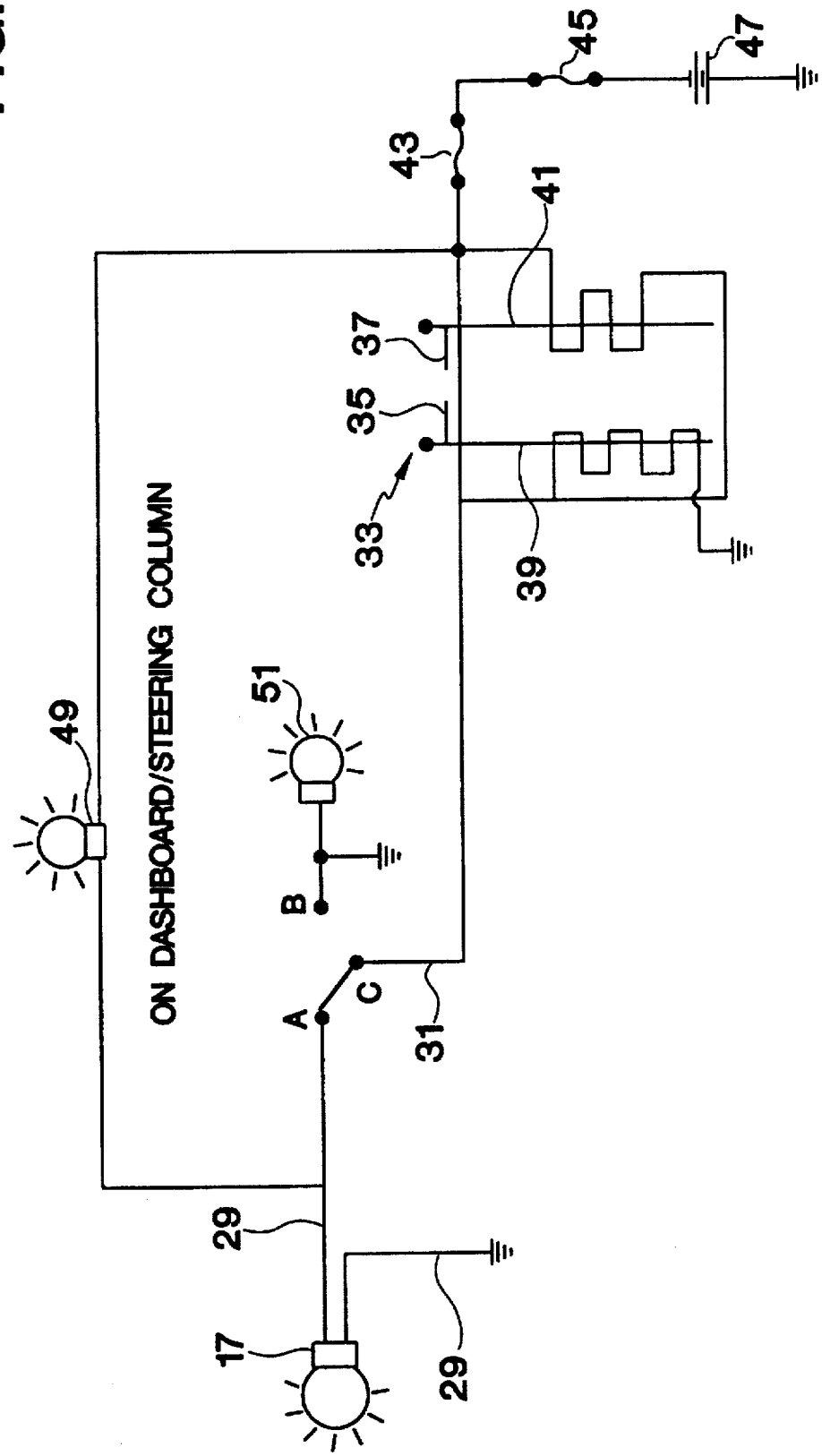
FIG. 3 is a schematic circuit diagram of the invention's preferred embodiment.

FIG. 3 is a schematic circuit diagram of the invention's preferred embodiment. Essentially it is a conventional flashing direction indicator as found on many vehicles which utilizes bimetallic strips whose electrical contacts make and break the circuit. Light bulb 17 is shown connected to the two wires 29 one of which goes to ground. The other wire 29 goes to a switch 31 located in the vehicle's interior passenger compartment adjacent to the operator such as on its dashboard or steering column. When switch 31 is actuated by the operator to position A (it has three possible positions), a circuit is completed through the bimetallic contacts 33. There are two electrically conducting contacts 35 and 37 which are attached, respectively, to different metal strips 39 and 41. When the contacts 35 and 37 touch current flow through them and the fuse 43 and ignition switch 45 from 12 volt direct current auto battery 47. Since, the different metal strips 39 and 41 are effected differently by the current's supplied heat they move differently in the same direction breaking the space between the two touching contacts 35 and 37. When this happens current flows through dashboard indicator light 49 until the contacts touch again.

Three positions were indicated for the switch 31. The second position B would be an opened circuit with no current flowing to either bulb while the third position C would supply current to the other bulb 51. Bulb 51, which is also behind a U-turn indicator having a lens and down arrow U-turn icon like rear indicator 3, could be located on the vehicle's front bank of lights next to its conventional signal light above its bumper. This would alert oncoming drivers of the intention to make a U-turn.

Clearly, variations to the disclosed embodiment are possible. The bulbs 17 and 51 could be incorporated into a single multiholder unit for both the vehicle's signal lights and U-turn indicators but separately wired such that the U-turn icon is illuminated by a separate dashboard or steering column mounted switch from the one that controls the signal lights. There also could be four U-turn lights located near the four turn signal indicators but operated by a separate circuit and switch from the turn signal switches and circuits. Alternately, both the front and rear U-turn indicators could flash at the same or approximately the same time to alert operators to the front and rear of the driver's intention to make a U-turn.

Many of the primary components of the U-turn signal, such as the indicator 3 and its icon 5 and lens 7; and the lamp base plate 27, could be manufactured sing the plastic injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed ( in this case the indicator, lens with icon and base plate ). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's mentioned plastic components cost effectively.

Different colors of transparent high impact plastic (such as acrylic) are used to manufacture the different colored lens components of the U-turn indicator. In some cases where there are two colors of plastic used on the same lens assembly, a combination mold may be used where two colors of plastic are injected into the same mold on different sides at the same time. It is possible however to create and mold the components separately, using hand assembly as a final procedure.

The lamp bulbs used are conventional turn signal bulbs currently used in automobiles or other motor driven trucks or vehicles.

The switch 31 used to actuate the U-turn indicator may be incorporated into the conventional turn signal switch assemblies or may be separately installed elsewhere on the steering column. If a separate switch is used, a commercial source for such switches may be obtained by consulting the Thomas Register of manufacturers.

Although the U-turn signal and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A U-turn indicator on a motor vehicle comprising:
   a motor vehicle having a separate closable motor vehicle operator's compartment and two ends,
   a bank of signaling lights located exterior to said compartment on a vehicle end;
   an electrically operated visual indicator having a protective light transparent lens with a U-turn icon thereon;
   said indicator being mounted exterior to the operator's compartment on the vehicle's end having the vehicle's bank of signaling lights, adjacent and in-line with said signaling lights;
   a control switch and circuitry for controlling the supply of electrical current to said visual indicator with a U-turn icon thereon, said switch being mounted in the vehicle's operator's compartment.

2. The invention as claimed in claim 1, wherein said vehicle has an operator's compartment dashboard with said control switch mounted thereon.

3. The invention as claimed in claim 1, wherein said vehicle has an operator's compartment steering column with the control switch mounted thereon.

4. The invention as claimed in claim 1, wherein said vehicle has a rear bank of signaling lights with a signal indicator, said visual indicator of a U-turn being adjacent to said rear bank's signal indicator.

5. The invention as claimed in claim 4, wherein said visual indicator for the U-turn is controlled independently of said turn signal indicator and transmits a flashing light.

6. The invention as claimed in claim 5, wherein bimetallic strips whose electrical contacts are intermittently closed and opened are used in the circuitry for said U-turn indicator to cause said transmitted flashing light.

* * * * *